(12) United States Patent
Zavurov et al.

(10) Patent No.: US 10,651,967 B1
(45) Date of Patent: May 12, 2020

(54) COMMUNICATION USING MULTIPLE MODULATION CODING SCHEMES BASED ON DIFFERENCE IN TIME FROM DEMODULATION REFERENCE SIGNAL COMMUNICATION

(71) Applicant: QUALCOMM Incorporated, San Diego, CA (US)

(72) Inventors: Lev Zavurov, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,082

(22) Filed: Feb. 13, 2019

(51) Int. Cl.
*H04L 1/00* (2006.01)
*H04L 27/26* (2006.01)
*H04L 5/00* (2006.01)

(52) U.S. Cl.
CPC .......... *H04L 1/0003* (2013.01); *H04L 5/0048* (2013.01); *H04L 27/2626* (2013.01)

(58) Field of Classification Search
CPC ... H04L 1/0003; H04L 1/0009; H04L 5/0007; H04L 5/0048
See application file for complete search history.

(56) References Cited

U.S. PATENT DOCUMENTS 10,491,354 B2 * 11/2019 Kim ...................... H04L 5/0055

* cited by examiner

*Primary Examiner* — Chandrahas B Patel
(74) *Attorney, Agent, or Firm* — Patterson + Sheridan, LLP

(57) ABSTRACT

Aspects of the present disclosure provide a method performed at a user equipment (UE) that includes determining a first suggested modulation coding scheme (MCS) and a second suggested MCS for one or more first time periods and one or more second time periods, respectively, based on first/second time differences between the one or more first time periods/second time periods and one or more time periods allocated for a demodulation reference signal (DMRS). The method further includes receiving, from the BS, an indication of a first MCS and a second MCS determined by the BS based on the first suggested MCS and the second suggested MCS. The method further includes receiving, from the BS, data in the one or more first time periods using the first MCS and data in the one or more second time periods using the second MCS.

30 Claims, 15 Drawing Sheets

COMMUNICATION USING MULTIPLE MODULATION CODING SCHEMES BASED ON DIFFERENCE IN TIME FROM DEMODULATION REFERENCE SIGNAL COMMUNICATION

INTRODUCTION

Aspects of the present disclosure relate to wireless communications, and more particularly, to determining modulation coding schemes to use for communication based on a timing of communication relative to timing of communication of a demodulation reference signal (DMRS).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a BS. The method generally includes determining a first modulation coding scheme (MCS) for transmitting data in one or more first time periods based on a first difference in time between the one or more first time periods and one or more time periods allocated for transmitting a demodulation reference signal (DMRS). The method further includes determining a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference. The method further includes transmitting data to a user equipment (UE) in the one or more first time periods using the first MCS. The method further includes transmitting data to the UE in the one or more second time periods using the second MCS. The method further includes transmitting the DMRS to the UE in the one or more time periods allocated for transmitting the DMRS.

Certain aspects provide a method for wireless communication by a UE. The method generally includes determining a first suggested modulation coding scheme (MCS) for a base station (BS) to transmit data to the UE in one or more first time periods based on a first difference in time between the one or more first time periods and one or more time periods allocated for a demodulation reference signal (DMRS). The method further includes determining a second suggested MCS for the BS to transmit data to the UE in one or more second time periods based on a second difference in time between the one or more second time periods and the one or more time periods allocated for the DMRS, the first suggested MCS indicating a higher data rate than the second suggested MCS based on the first difference being less than the second difference. The method further includes transmitting, to the BS, an indication of the first suggested MCS and the second suggested MCS. The method further includes receiving, from the BS, an indication of a first MCS and a second MCS determined by the BS based on the first suggested MCS and the second suggested MCS. The method further includes receiving, from the BS, data in the one or more first time periods using the first MCS. The method further includes receiving, from the BS, data in the one or more second time periods using the second MCS. The method further includes receiving, from the BS, the DMRS in the one or more time periods allocated for the DMRS.

Certain aspects provide a BS including a memory and a processor couple to the memory. The processor is configured to determine a first modulation coding scheme (MCS) for transmitting data in one or more first time periods based on a first difference in time between the one or more first time periods and one or more time periods allocated for transmitting a demodulation reference signal (DMRS). The processor is further configured to determine a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference. The processor is further configured to transmit data to a user equipment (UE) in the one or more first time periods using the first MCS. The processor is further configured to transmit data to the UE in the one or more second time periods using the second MCS. The processor is further configured to transmit the DMRS to the UE in the one or more time periods allocated for transmitting the DMRS.

Certain aspects provide a UE including a memory and a processor couple to the memory. The processor is configured to determine a first suggested modulation coding scheme (MCS) for a base station (BS) to transmit data to the UE in one or more first time periods based on a first difference in time between the one or more first time periods and one or more time periods allocated for a demodulation reference signal (DMRS). The processor is further configured to determine a second suggested MCS for the BS to transmit data to the UE in one or more second time periods based on a second difference in time between the one or more second time periods and the one or more time periods allocated for the DMRS, the first suggested MCS indicating a higher data rate than the second suggested MCS based on the first difference being less than the second difference. The processor is further configured to transmit, to the BS, an indication of the first suggested MCS and the second suggested MCS. The processor is further configured to receive, from the BS, an indication of a first MCS and a second MCS determined by the BS based on the first suggested MCS and the second suggested MCS. The processor is further configured to receive, from the BS, data in the one or more first time periods using the first MCS. The processor is further configured to receive, from the BS, data in the one or more second time periods using the second MCS. The processor is further configured to receive, from the BS, the DMRS in the one or more time periods allocated for the DMRS.

Certain aspects provide a non-transitory computer-readable storage medium that when executed by a BS, cause the BS to perform a method for wireless communication. The method generally includes determining a first modulation coding scheme (MCS) for transmitting data in one or more first time periods based on a first difference in time between the one or more first time periods and one or more time periods allocated for transmitting a demodulation reference signal (DMRS). The method further includes determining a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference. The method further includes transmitting data to a user equipment (UE) in the one or more first time periods using the first MCS. The method further includes transmitting data to the UE in the one or more second time periods using the second MCS. The method further includes transmitting the DMRS to the UE in the one or more time periods allocated for transmitting the DMRS.

Certain aspects provide a non-transitory computer-readable storage medium that when executed by a UE, cause the UE to perform a method for wireless communication. The method generally includes determining a first suggested modulation coding scheme (MCS) for a base station (BS) to transmit data to the UE in one or more first time periods based on a first difference in time between the one or more first time periods and one or more time periods allocated for a demodulation reference signal (DMRS). The method further includes determining a second suggested MCS for the BS to transmit data to the UE in one or more second time periods based on a second difference in time between the one or more second time periods and the one or more time periods allocated for the DMRS, the first suggested MCS indicating a higher data rate than the second suggested MCS based on the first difference being less than the second difference. The method further includes transmitting, to the BS, an indication of the first suggested MCS and the second suggested MCS. The method further includes receiving, from the BS, an indication of a first MCS and a second MCS determined by the BS based on the first suggested MCS and the second suggested MCS. The method further includes receiving, from the BS, data in the one or more first time periods using the first MCS. The method further includes receiving, from the BS, data in the one or more second time periods using the second MCS. The method further includes receiving, from the BS, the DMRS in the one or more time periods allocated for the DMRS.

Certain aspects provide a BS. The BS generally includes means for determining a first modulation coding scheme (MCS) for transmitting data in one or more first time periods based on a first difference in time between the one or more first time periods and one or more time periods allocated for transmitting a demodulation reference signal (DMRS). The BS further includes means for determining a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference. The BS further includes means for transmitting data to a user equipment (UE) in the one or more first time periods using the first MCS. The BS further includes means for transmitting data to the UE in the one or more second time periods using the second MCS. The BS further includes means for transmitting the DMRS to the UE in the one or more time periods allocated for transmitting the DMRS.

Certain aspects provide a UE. The UE generally includes means for determining a first suggested modulation coding scheme (MCS) for a base station (BS) to transmit data to the UE in one or more first time periods based on a first difference in time between the one or more first time periods and one or more time periods allocated for a demodulation reference signal (DMRS). The UE further includes means for determining a second suggested MCS for the BS to transmit data to the UE in one or more second time periods based on a second difference in time between the one or more second time periods and the one or more time periods allocated for the DMRS, the first suggested MCS indicating a higher data rate than the second suggested MCS based on the first difference being less than the second difference. The UE further includes means for transmitting, to the BS, an indication of the first suggested MCS and the second suggested MCS. The UE further includes means for receiving, from the BS, an indication of a first MCS and a second MCS determined by the BS based on the first suggested MCS and the second suggested MCS. The UE further includes means for receiving, from the BS, data in the one or more first time periods using the first MCS. The UE further includes means for receiving, from the BS, data in the one or more second time periods using the second MCS. The UE further includes means for receiving, from the BS, the DMRS in the one or more time periods allocated for the DMRS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
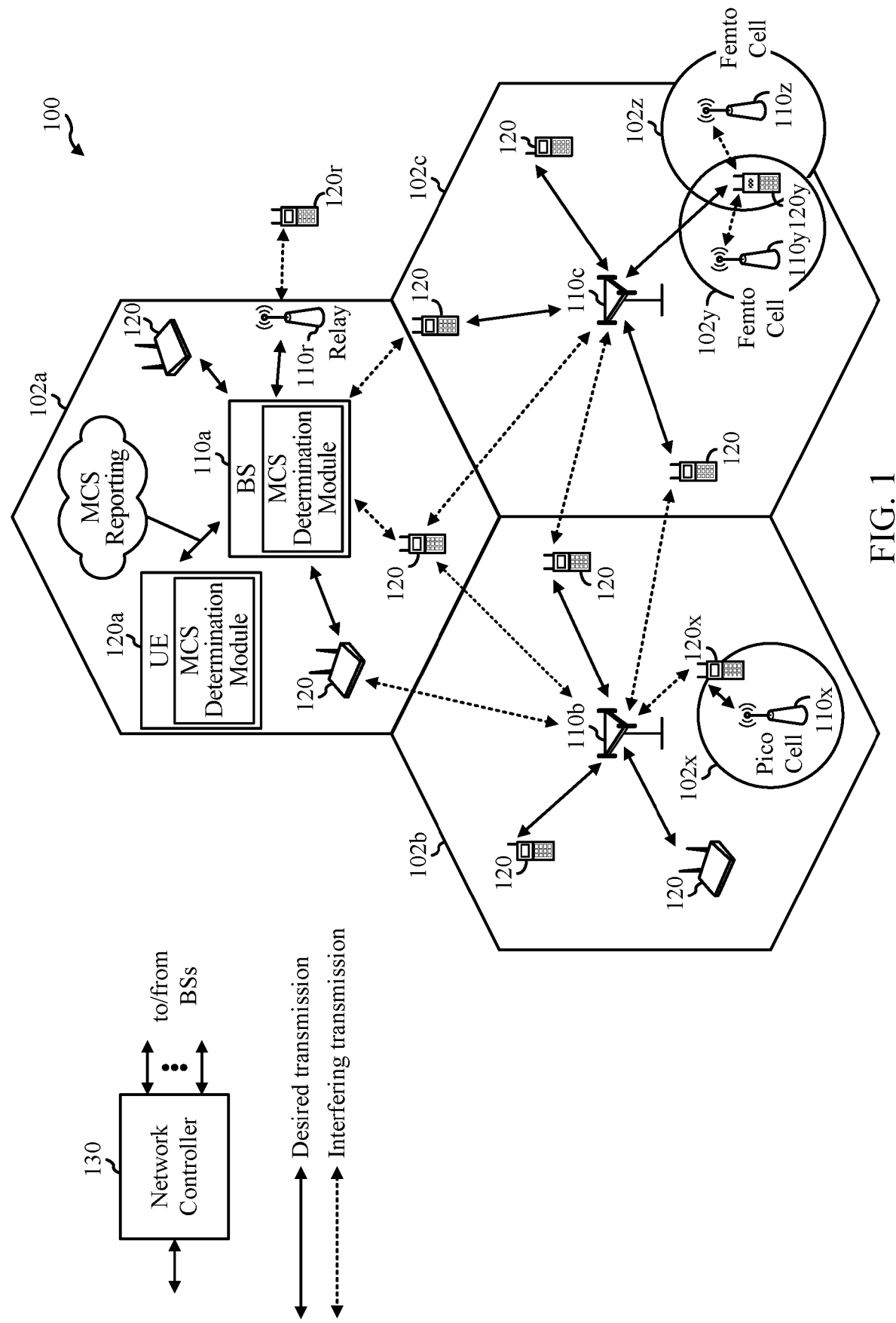
FIG. 1 is a block diagram conceptually illustrating an example telecommunications system, in accordance with certain aspects of the present disclosure.

Aspects of the present disclosure provide apparatus, methods, processing systems, and computer readable mediums for determining modulation coding schemes (MCSs) to use for communication based on a timing of communication relative to timing of communication of a demodulation reference signal (DMRS). Certain aspects provide for determining and utilizing multiple different MCSs in different symbols of a slot based on a timing of the symbols relative to communication of the DMRS.

BSs and UEs can communicate using different MCSs. The MCS is used to determine the data rate of a wireless connection. Accordingly, by using different MCSs, BSs and UEs can communicate at different data rates. In certain cases, on the DL, the BS is configured to transmit to a UE, and the UE is configured to receive, all symbols within a slot using the same MCS, meaning the same data rate is used to communicate all the data in a slot. The MCS for the slot may be chosen so that all the symbols in the slot can be received and decoded (e.g., demodulated) successfully by the UE.

For example, channel conditions between the BS and UE change over time. In a slot, the BS transmits to the UE a DMRS as well as data (e.g., in a PDSCH), which the UE receives. The UE utilizes the DMRS to facilitate decoding of the PDSCH. In particular, the DMRS can be used by the UE to estimate channel conditions for demodulation of the PDSCH. The BS transmits the DMRS in one or more symbols of a slot, and further transmits the PDSCH in different symbols of the slot than those used to transmit the DMRS. Accordingly, some symbols carrying PDSCH are transmitted by the BS closer to the transmission of a DMRS, and some symbols carrying PDSCH are transmitted by the BS further from the transmission of a DMRS.

Since channel conditions change over time, the channel estimate made by the UE using the received DMRS is typically more accurate for those symbols carrying PDSCH that are closer to the reception of the DMRS than for those symbols carrying PDSCH that are further from the reception of the DMRS. Therefore, decoding and demodulation of those symbols carrying PDSCH that are closer in time to the reception of the DMRS has a higher likelihood of success than of those symbols carrying PDSCH that are further in time from the reception of the DMRS. A higher likelihood of success for decoding may mean that a higher data rate can be used for those symbols, while still allowing the UE to successfully decode the symbols. As discussed, typically, a single MCS is chosen for the PDSCH so that all symbols in the slot can be received by the UE and decoded successfully. Accordingly, the single MCS is chosen such that even the symbols carrying PDSCH that are further in time from the reception of the DMRS can be successfully decoded by the UE.

Aspects herein relate to techniques for using different MCSs for different symbols of a slot, where the MCS is based on a timing or distance of the symbol relative to the DMRS. Advantageously, such use of different MCSs allows improved throughput for communication between the BS and UE. For example, a higher MCS and therefore higher date rate may be used for symbols closer to the DMRS, since they may be successfully decoded even at the higher rate, thereby improving throughput. Further, a lower MCS and therefore lower rate may be used for symbols further from the DMRS, thereby still ensuring that they can be decoded properly.

In certain aspects, two MCS are used in a slot, thereby increasing throughput, while keeping the amount of control data needed to send to indicate the MCS between the UE and BS lower.

In certain aspects, more than two MCS are used in a slot to further increase throughput.

In certain aspects, multiple DMRS are sent in a slot, so more symbols can be sent using a higher MCS, thereby further increasing throughput.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, a user equipment (UE), such as the UE 120a in the wireless communication network 100 communicates with a serving base station (BS), such as the BS 110a in a cell 102a in the wireless communication network 100. The UE 120a includes a MCS determination module configured to determine multiple suggested MCS for communication in symbols of a slot based on a timing of the symbols relative to a DMRS, as further discussed herein. The BS 110a includes a MCS determination module configured to determine multiple MCS for communication in symbols of a slot based on a timing of the symbols relative to a DMRS, as further discussed herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110$r$ may communicate with the BS 110$a$ and a UE 120$r$ in order to facilitate communication between the BS 110$a$ and the UE 120$r$. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120$x$, 120$y$, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
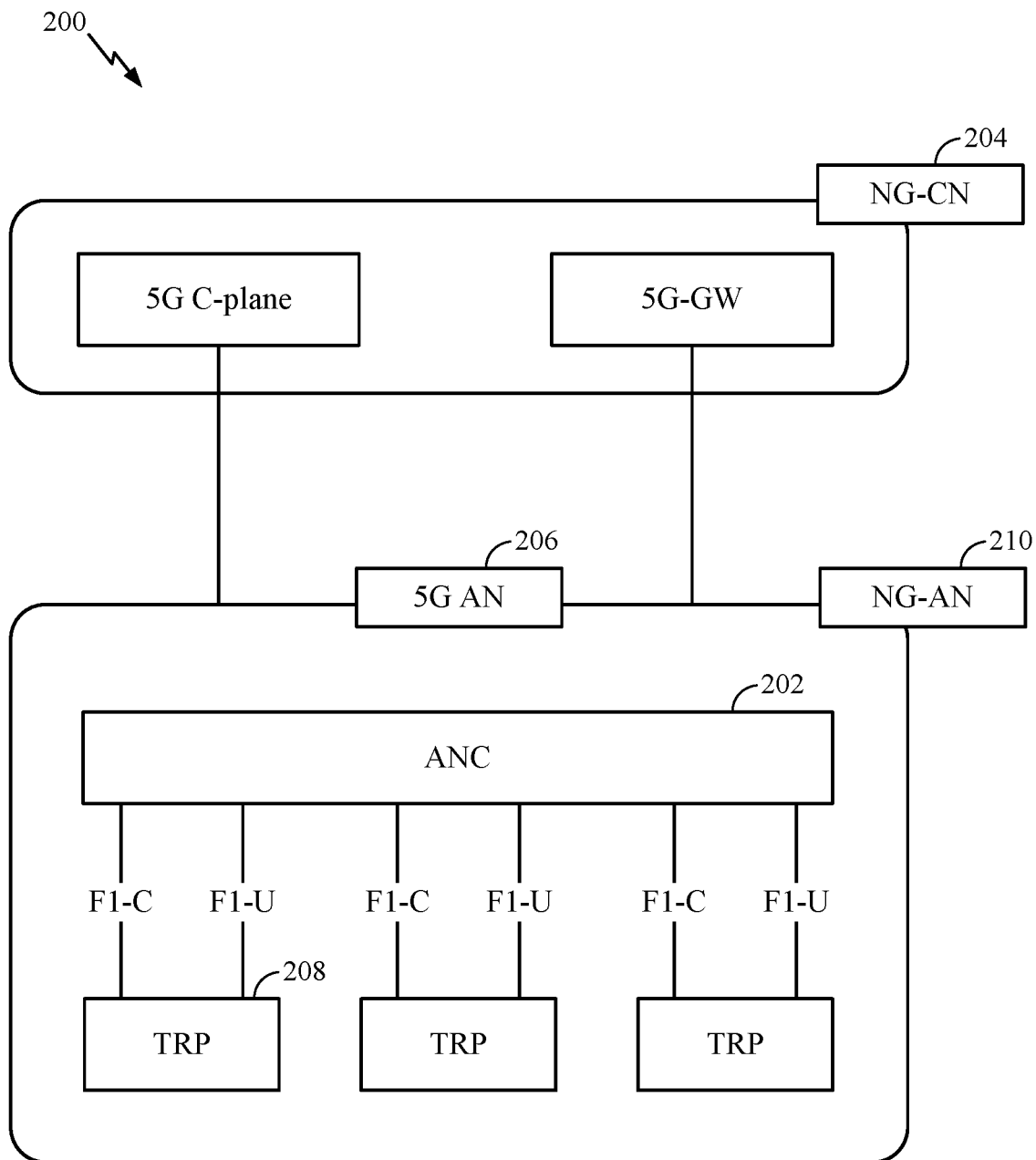
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
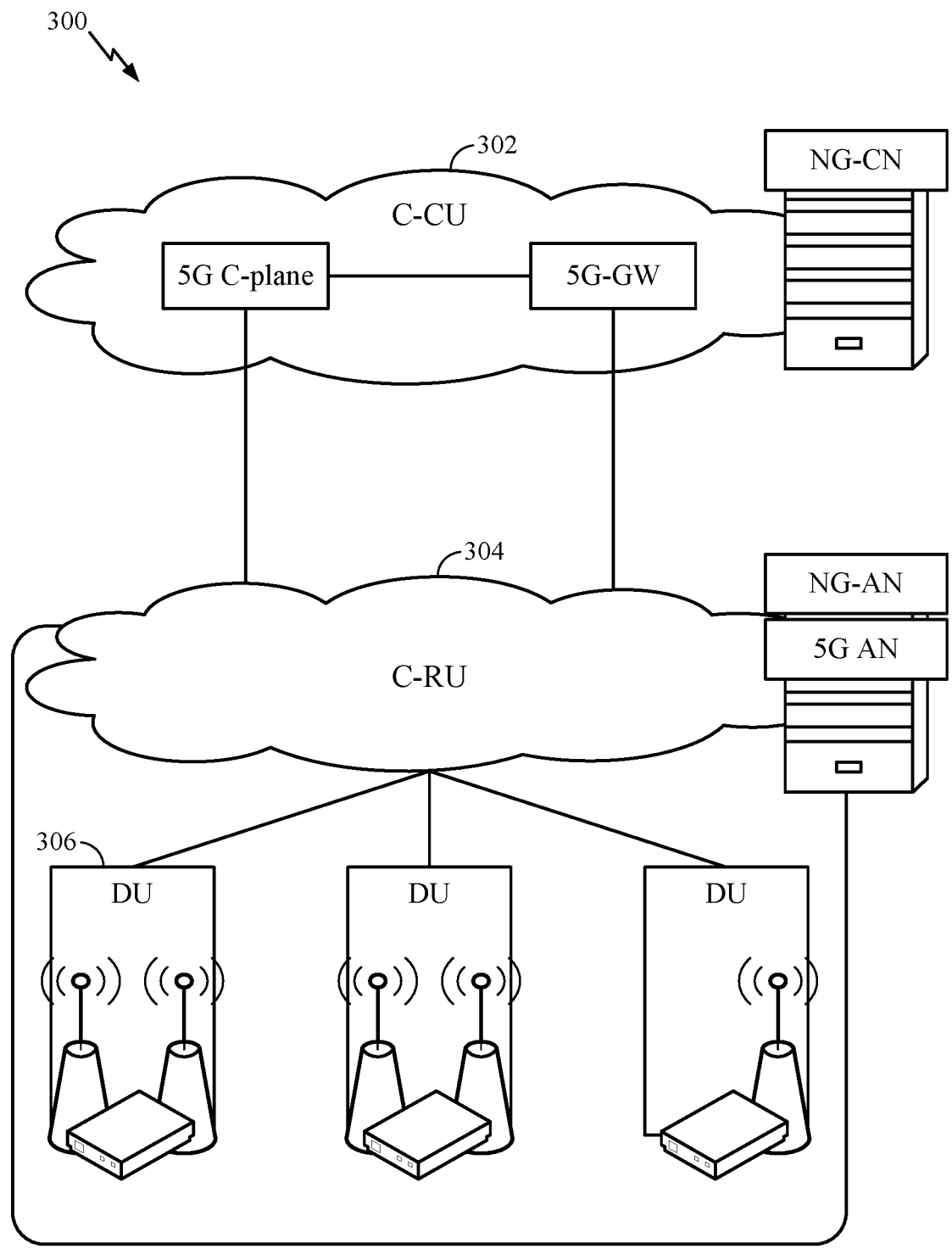
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
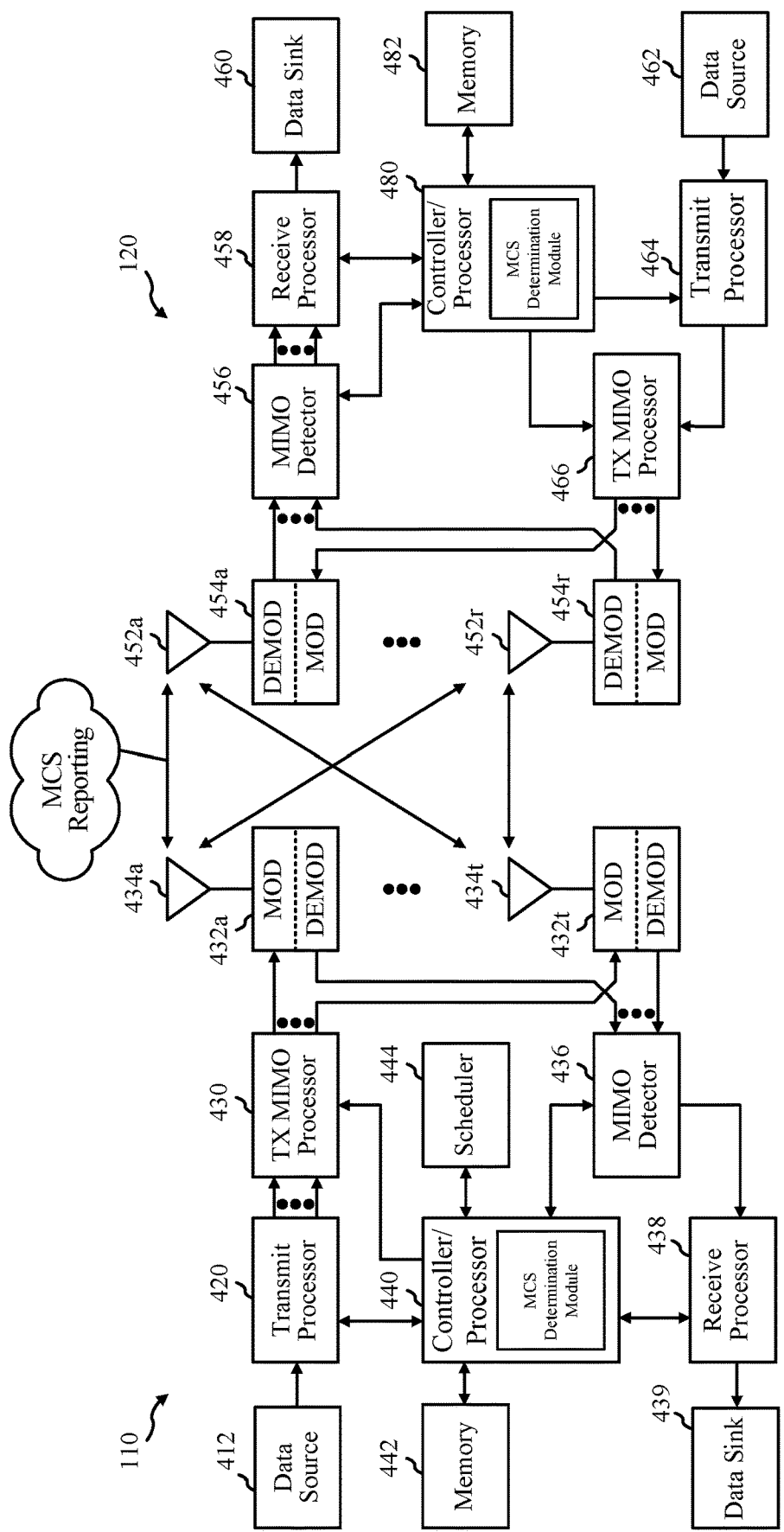
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. For example, as shown in FIG. 4, the processor 440 has a MCS determination module for determining multiple MCSs for a slot, as described in more detail herein. The processor 480 and/or other processors and modules at the UE 120 may perform or direct the execution of processes for the techniques described herein. For example, as shown in FIG. 4, the processor 480 has a MCS determination module for determining multiple suggested MCSs for a slot. The memories 442 and 482 may store data and program codes for BS 110 and UE 120, respectively. A scheduler 444 may schedule UEs for data transmission on the downlink and/or uplink.

Figure 5:
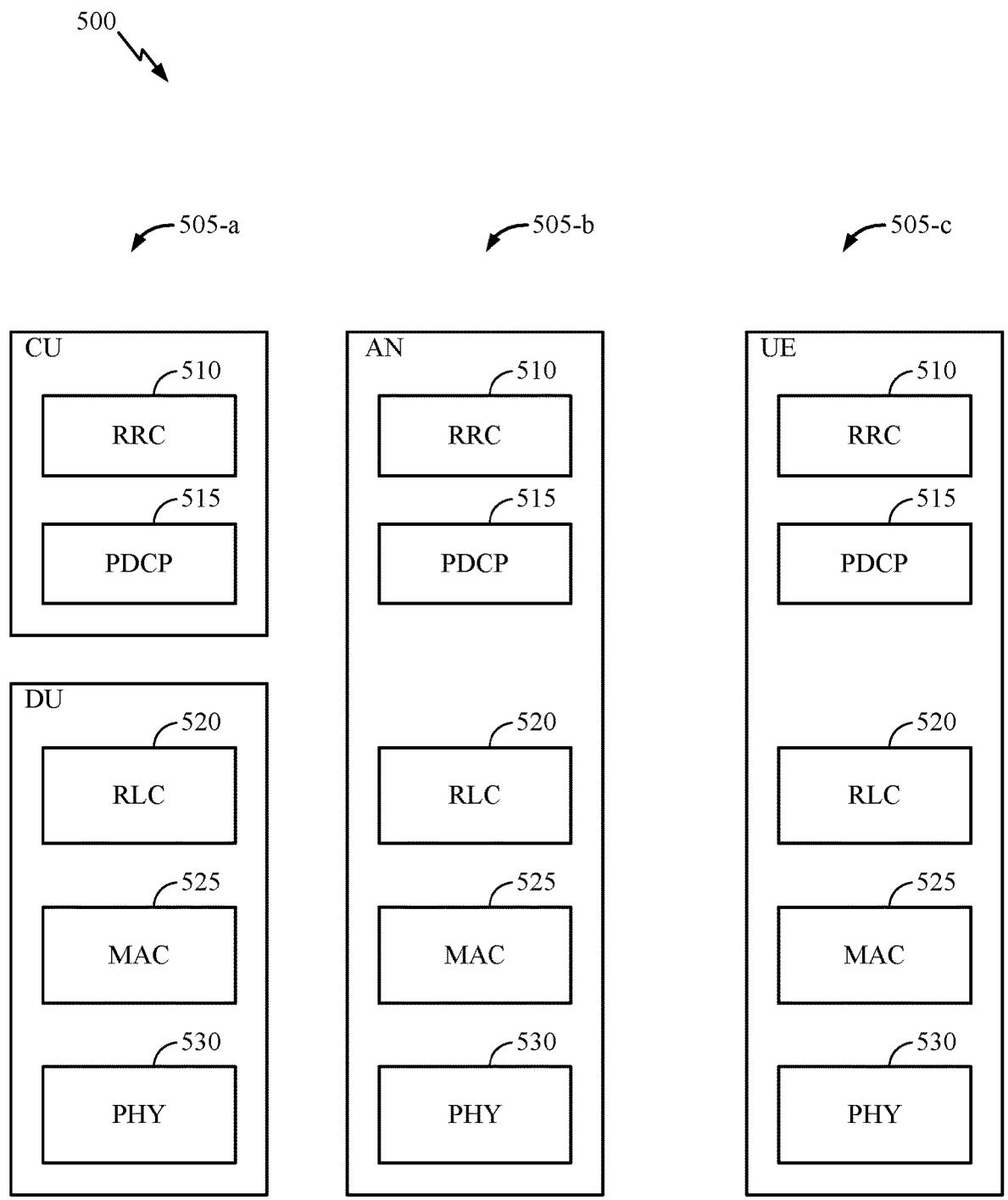
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
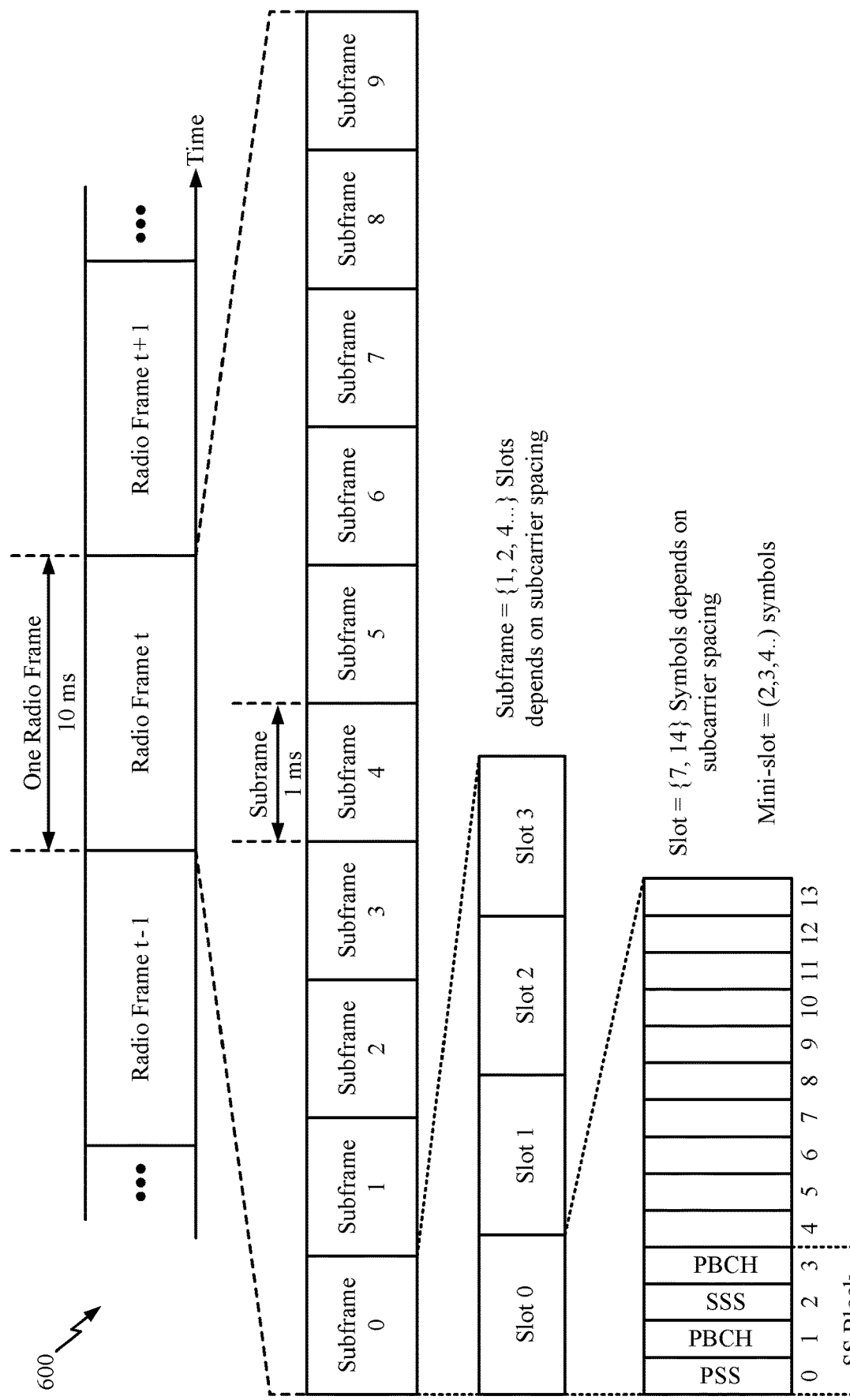
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within a radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Communication Using Multiple Modulation Coding Schemes Based on Difference in Time from Demodulation Reference Signal Communication Aspects of this disclosure are related to techniques for using different MCSs for communicating on different symbols of a slot (or similarly other different time periods of an overall time period). In particular, certain aspects provide techniques for determining MCS to use for communication based on a timing of communication relative to timing of communication of a DMRS and communicating using the determined MCS.

Figure 7:
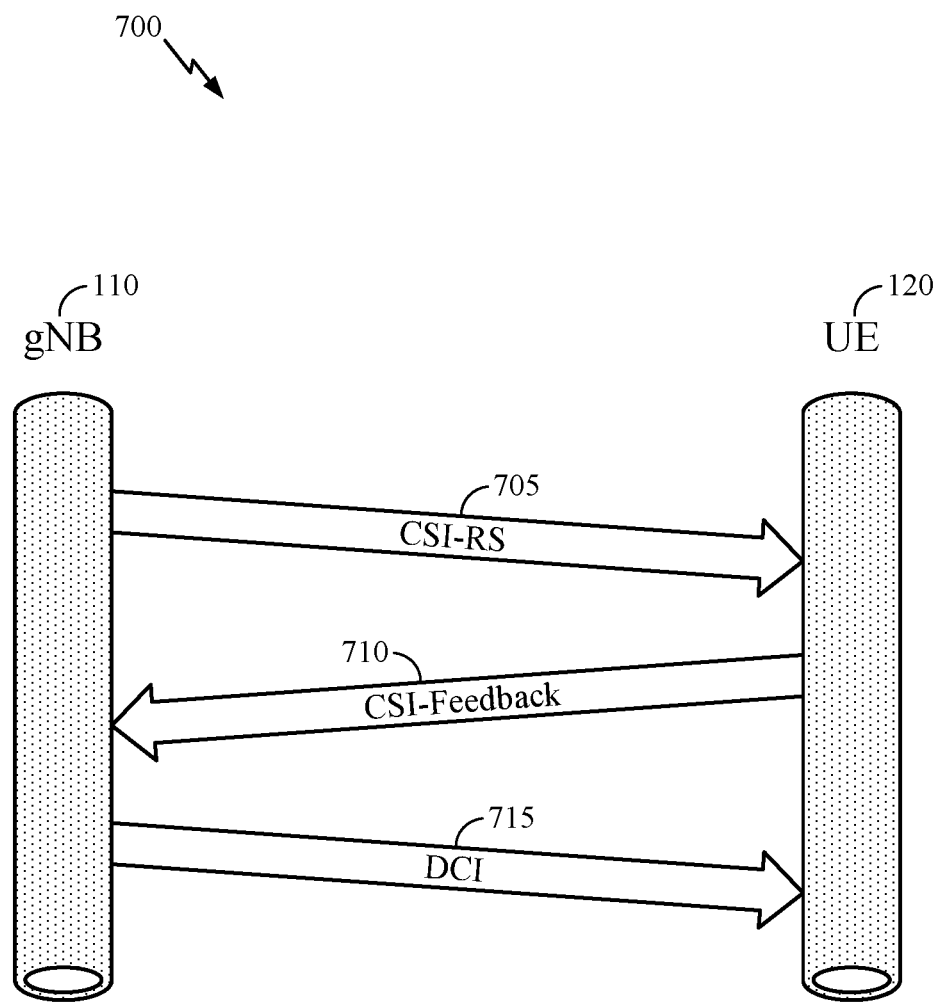
FIG. 7 is a timing diagram illustrating a procedure for a BS and UE to exchange information to determine one or more MCSs to use for communication, such as in a slot, in accordance with certain aspects.

FIG. 7 is a timing diagram 700 illustrating a procedure for a BS and UE to exchange information to determine one or more MCSs to use for communication, such as in a slot, in accordance with certain aspects.

At time 705, BS 110 transmits to UE 120 a channel state information reference signal (CSI-RS). The UE 120 uses the CSI-RS to measure/estimate the channel between the BS 110 and the UE 120. Based on the measurement of the CSI-RS, the UE 120 determines channel state information suggested parameters such as a suggested one or more of a channel quality indicator (CQI), rank indicator (RI), precoding matrix indicator (PMI), and MCS for the BS 110 to use to encode and transmit data to the UE 120 in a slot later in time to transmission of the CSI-RS. For example, the PMI indicates a codebook (e.g., pre-agreed parameters) for the BS 110 to use for data transmission over multiple antennas. RI indicates the number of transmission layers that the UE 120 can distinguish.

At time 710, the UE 120 transmits the determined CSI in a CSI-feedback message to the BS 110. Based on the CSI-feedback, the BS 110 determines one or more parameters, such as an actual codebook, number of transmission layers, and/or MCS to use to encode and transmit data to the UE 120 in a slot later in time to transmission of the CSI-RS.

For example, the BS 110 may determine the same parameters as suggested by the UE 120 in the CSI-feedback, or different parameters, such as based on additional information at the BS 110.

In certain aspects, the additional information comprises one or more parameters comprising one or more of a velocity of the UE 120, a Doppler between the BS 110 and the UE 120, or a block error rate between the BS 110 and the UE 120. The BS 110 may determine such information by measuring signals received from the UE 120 (e.g., over any appropriate channel, such as even by measuring the CSI-feedback). The BS 110 may further receive information from the UE 120 indicative of such additional information, such as in the CSI-feedback or another message.

At time 715, the BS 110 transmits an indication of the determined parameters, such as one or more of a PMI, RI, MCS to the UE 120 as part of downlink control information (DCI).

Accordingly, the BS 110 then transmits data to the UE 120 in a slot later in time using the parameters indicated in the DCI, and the UE 120 decodes the signals corresponding to the data based on the parameters indicated in the DCI.

Figure 8:
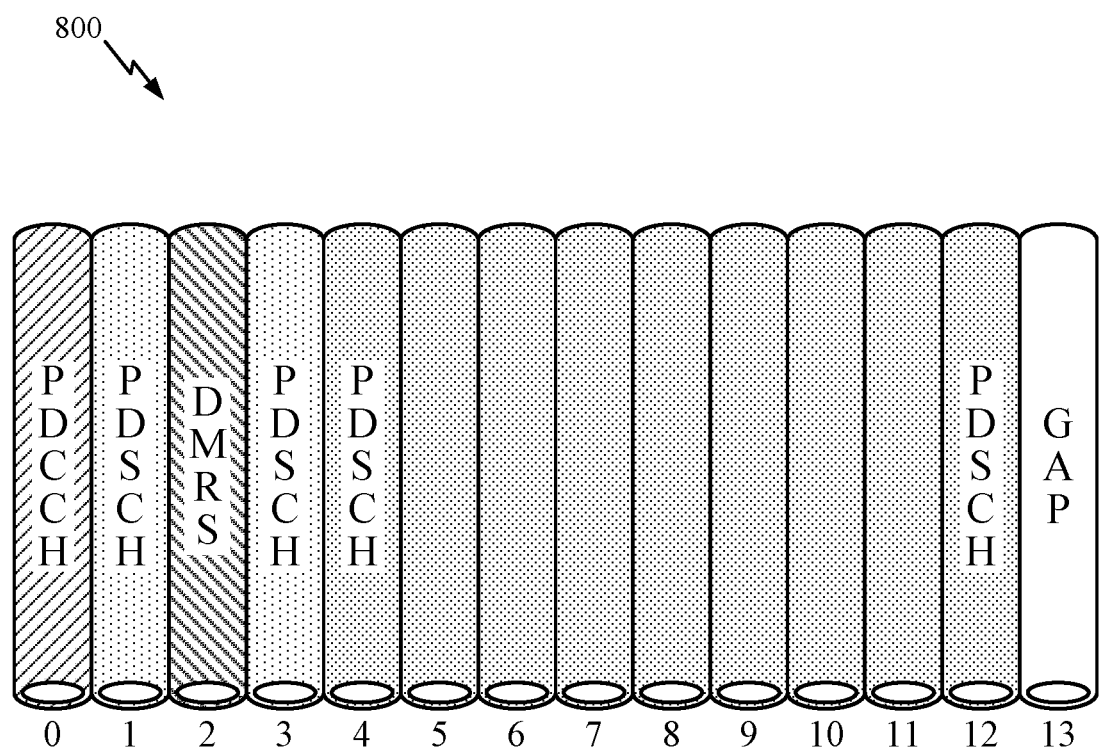
FIG. 8 is a diagram illustrating communication in a slot on the DL from a BS to a UE, in accordance with certain aspects.

FIG. 8 is a diagram illustrating communication in a slot on the DL from BS 110 to UE 120, in accordance with certain aspects. As shown, slot 800 includes 14 symbols (e.g., OFDM symbols) in time, where time is increasing horizontally. The slot 800 further spans a frequency range vertically. Though shown as a contiguous frequency range, it should be noted that the frequency range may not be contiguous.

As shown, the first symbol (symbol 0) is used by BS 110 to transmit control data or the PDCCH to UE 120. Symbol 1 and symbols 3-12 are used by the BS 110 to transmit data or PDSCH to the UE 120. Symbol 2 is used by the BS 110 to transmit DMRS to the UE 120. Symbol 14 is used as a gap between slots without transmission by BS 110.

As discussed, in certain aspects, a single MCS may be used for the PDSCH on all of symbols 1 and 3-12 in slot 800, meaning data is sent at the same rate in each of symbols 1 and 3-12. In certain aspects, since data can also be transmitted on the symbol with DMRS, symbol 2 also uses the single MCS. In such aspects, with reference again to FIG. 7, UE 120 may determine a single suggested MCS to include in the CSI-feedback it transmits at time 710. Further, the BS 110 may determine a single actual MCS to use and include in the DCI transmitted at time 715.

Figure 9:
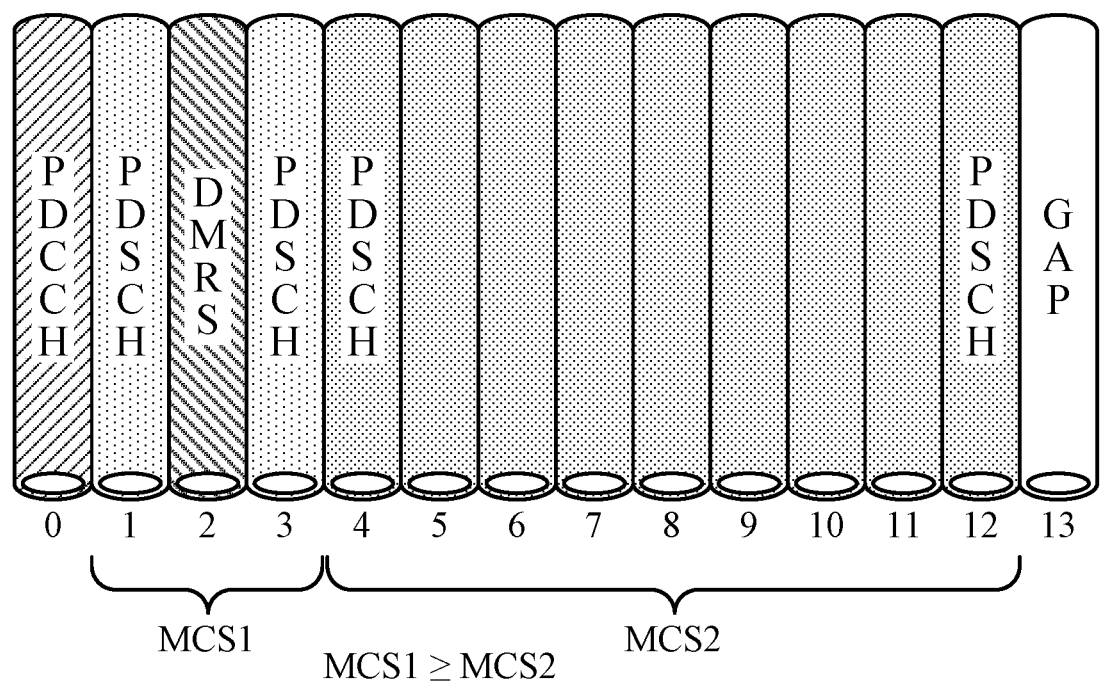
FIG. 9 is a diagram illustrating communication using multiple MCS for PDSCH in a slot on the DL from a BS to a UE, in accordance with certain aspects.

In certain aspects, different MCS may be used for the PDSCH on different symbols. For example, FIG. 9 is a diagram illustrating communication using multiple MCS for PDSCH in a slot on the DL from BS 110 to UE 120, in accordance with certain aspects. As shown, DMRS is still communicated on symbol 2. However, unlike as discussed with respect to FIG. 8 where a single MCS is used for all symbols carrying PDSCH, a first MCS is used for symbols 1 and 3, and a second MCS is used for symbols 4-12. In certain aspects, since data can also be transmitted on the symbol with DMRS, symbol 2 also uses the first MCS. The first MCS is higher than the second MCS, meaning that data is sent at a higher data rate over symbols 1 and 3, and a lower data rate over symbols 4-12. In particular, the first MCS is higher based on symbols 1 and 3 being less than or equal to a first difference in time (e.g., 1 symbol) from the DMRS on symbol 2 (and therefore being able to support a higher data rate as discussed). Further, the second MCS is lower based on symbols 4-12 being more than the first difference in time from the DMRS (and therefore supporting a lower data rate as discussed).

In such aspects, with reference again to FIG. 7, UE 120 may determine a first suggested MCS and a second suggested MCS to include in the CSI-feedback it transmits at time 710. The UE 120 may further indicate for which symbols the first suggested MCS and second suggested MCS are for (e.g., by indicating the index of the symbols as associated with the suggested MCSs). Further, the BS 110 may determine the first MCS and the second MCS to use and include in the DCI transmitted at time 715. The BS 110 may further indicate for which symbols the first MCS and second MCS are for (e.g., by indicating the index of the symbols as associated with the suggested MCSs). The UE 120 and BS 110 are configured to determine the suggested MCSs and actual MCS, respectively, based on a difference in time between communication of the symbol and communication of the DMRS.

It should be noted that more than two MCS may also be used for the PDSCH on different symbols. The UE 120 and BS 110 are still configured to determine the suggested MCSs and actual MCS, respectively, based on a difference in time between communication of the symbol and communication of the DMRS. However, instead of a single threshold time difference to determine between two MCSs, there may be multiple threshold time differences to determine between multiple MCSs.

Figure 10:
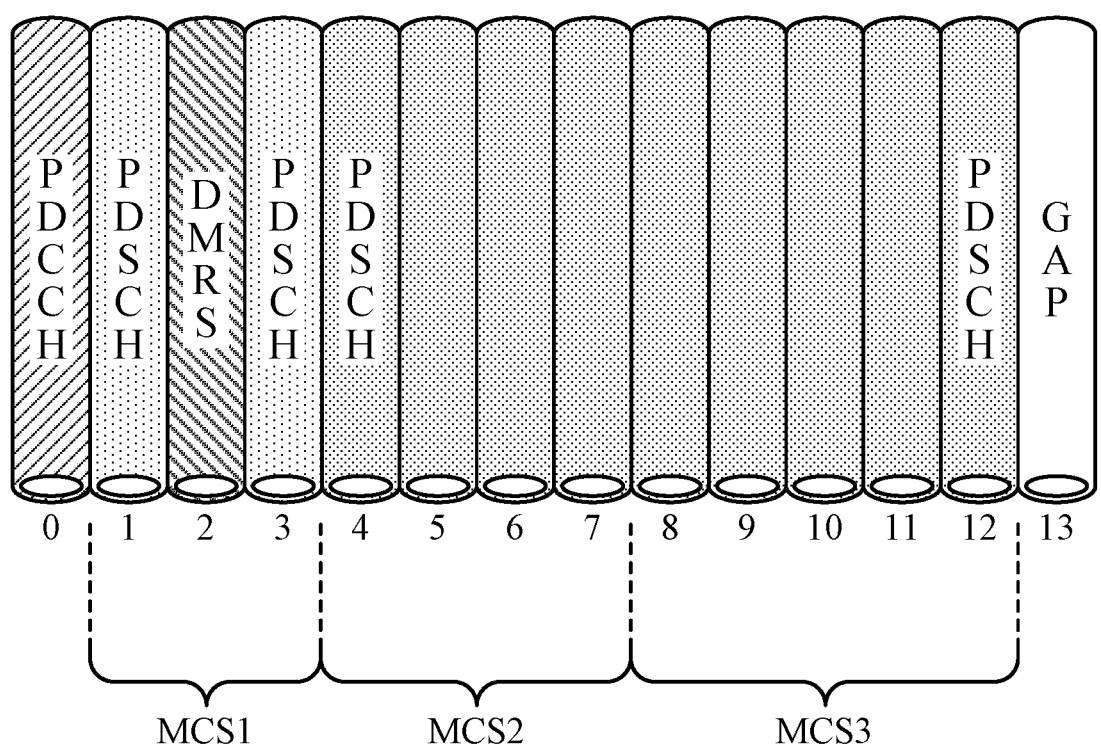
FIG. 10 is a diagram illustrating communication using multiple MCS for PDSCH in a slot on the DL from a BS to a UE, in accordance with certain aspects.

For example, FIG. 10 is a diagram illustrating communication using multiple MCS for PDSCH in a slot on the DL from BS 110 to UE 120, in accordance with certain aspects. As shown, DMRS is still communicated on symbol 2. A first MCS is used for symbols 1 and 3, a second MCS is used for symbols 4-7, and a third MCS is used for symbols 8-12. In certain aspects, since data can also be transmitted on the symbol with DMRS, symbol 2 also uses the first MCS. The first MCS is higher than the second MCS, and the second MCS is higher than the third MCS, meaning that data is sent at a higher data rate over symbols 1 and 3, a first lower data rate over symbols 4-7, and a second lower data rate lower than the first lower data rate over symbols 8-12. In particular, the first MCS is higher based on symbols 1 and 3 being less than or equal to a first difference in time (e.g., 1 symbol) from the DMRS on symbol 2 (and therefore being able to support a higher data rate as discussed). Further, the second MCS is lower based on symbols 4-7 being more than the first difference in time from the DMRS (and therefore supporting a lower data rate as discussed) but less than or equal to a second difference in time (e.g., 5 symbols) from the DMRS on symbol 2. The third MCS is even lower based on symbols 8-12 being more than the second difference in time from the DMRS (and therefore supporting an even lower data rate as discussed).

It should also be noted that multiple DMRS can be transmitted in a slot. In certain such aspects, the difference in time used to determine the suggested MCS/MCS to use for a PDSCH on a particular symbol can be based on a combination (e.g., formula, weighted formula, etc.) of the differences in time between each DMRS in the slot, or can be based on the least of the differences in time between the symbol and each of the DMRS in the slot.

Figure 11:
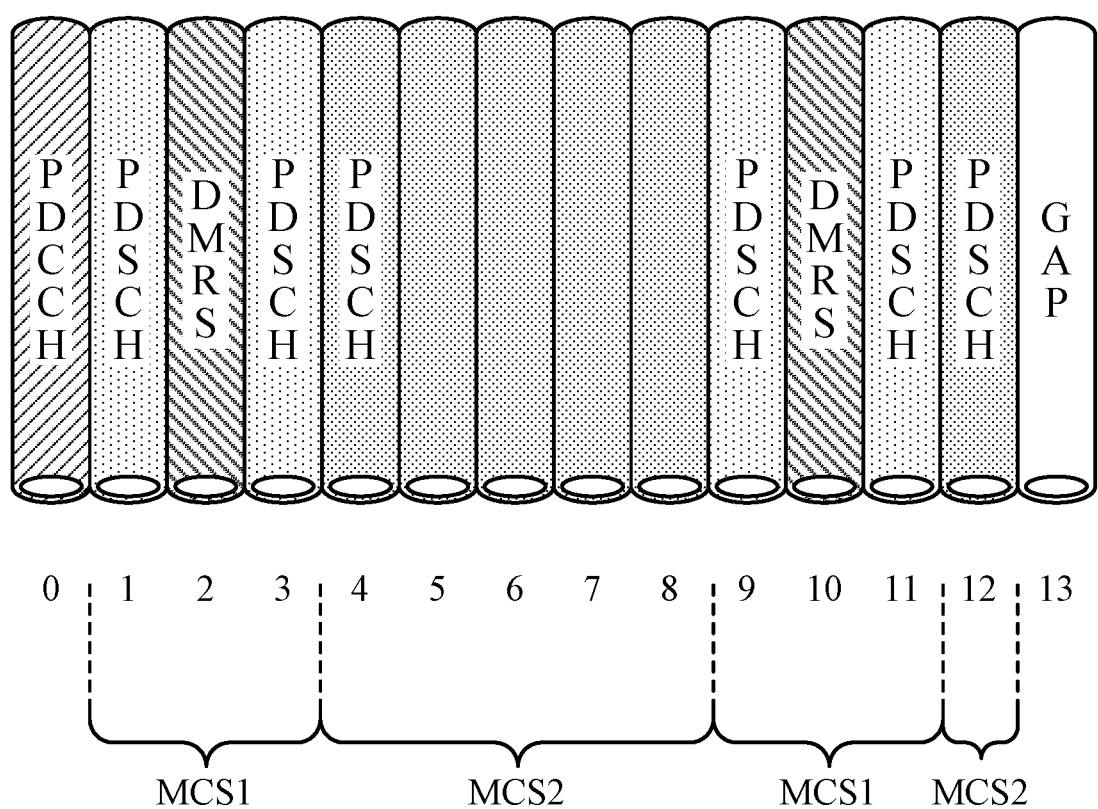
FIG. 11 is a diagram illustrating communication using multiple MCS for PDSCH in a slot on the DL from a BS to a UE, in accordance with certain aspects.

For example, FIG. 11 is a diagram illustrating communication using multiple MCS for PDSCH in a slot on the DL from BS 110 to UE 120, in accordance with certain aspects. As shown, DMRS is communicated on symbols 2 and 10. PDSCH is communicated on symbols 1, 3-9, 11, and 12. For symbols 1 and 3-5, the closest DMRS is on symbol 2, meaning the difference in time between each of these symbols and the DMRS on symbol 2 is the least of the differences in time between the symbol and each of the DMRS in the slot. For symbols 7-9, 11, and 12, the closest DMRS is on symbol 10, meaning the difference in time between each of these symbols and the DMRS on symbol 10 is the least of the differences in time. Symbol 6 is equidistant between symbols 2 and 10, so either can be used to determine the least difference in time. Assuming, as discussed with respect to FIG. 9 that two different MCS are used based on a first difference in time threshold (e.g., 1 symbol), the first MCS is used for symbols 1, 3, 9, and 11 (e.g., and symbols 2 and 10 with DMRS as discussed). Further, the second MCS is used for symbols 4-8 and 12.

Figure 12:
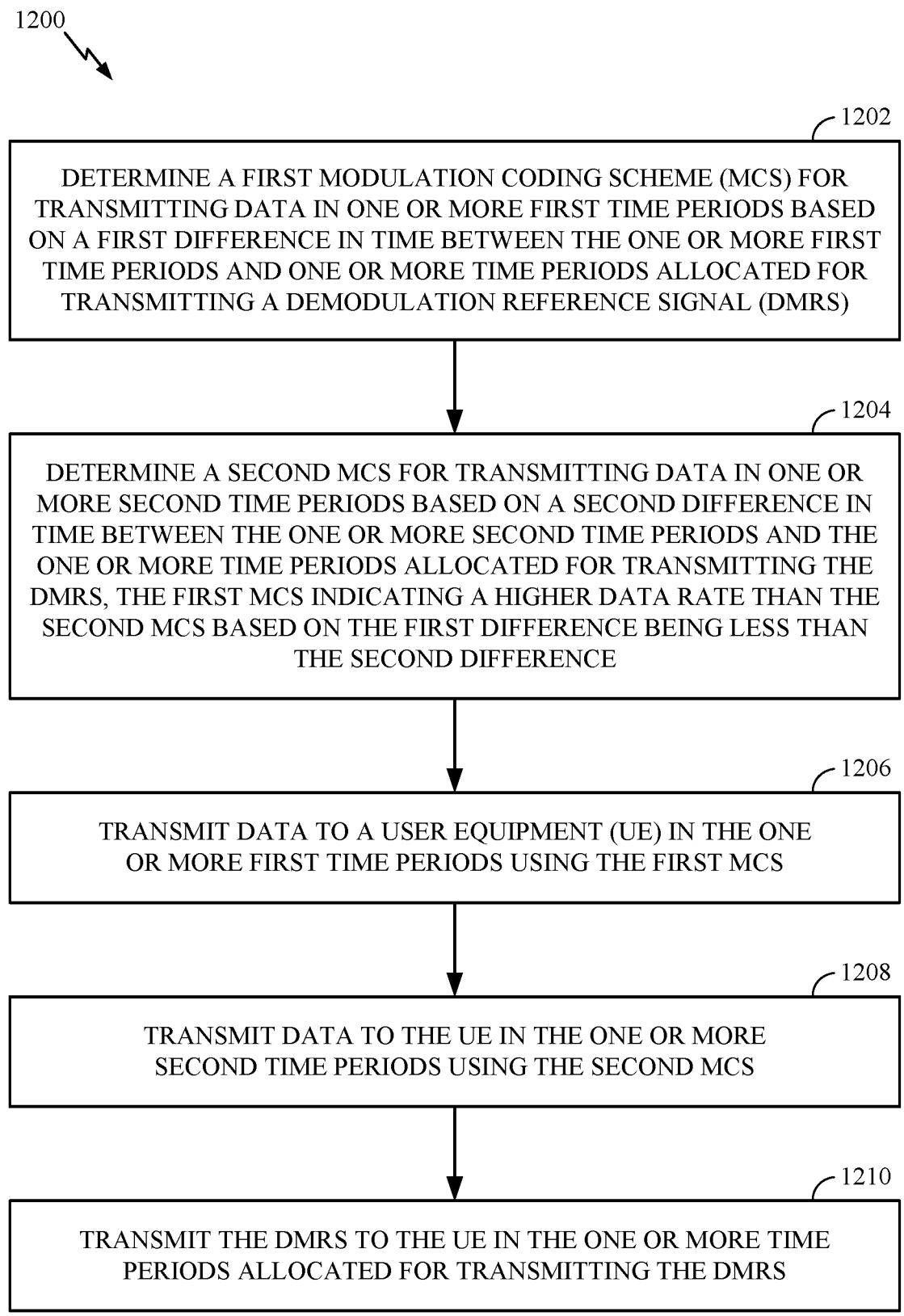
FIG. 12 is a flow diagram illustrating example operations for wireless communication, in accordance with certain aspects of the present disclosure

FIG. 12 is a flow diagram illustrating example operations 1200 for wireless communication, in accordance with certain aspects of the present disclosure. The operations 1200 may be performed by a BS, such as the BS 110.

The operations 1200 begin, at block 1202, by the BS determining a first modulation coding scheme (MCS) for transmitting data in one or more first time periods based on a first difference in time between the one or more first time periods and one or more time periods allocated for transmitting a demodulation reference signal (DMRS).

At block 1204, the BS determines a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference.

At block 1206, the BS transmits data to a user equipment (UE) in the one or more first time periods using the first MCS. At block 1208, the BS transmits data to the UE in the one or more second time periods using the second MCS. At block 1210, the BS transmits the DMRS to the UE in the one or more time periods allocated for transmitting the DMRS.

Figure 13:
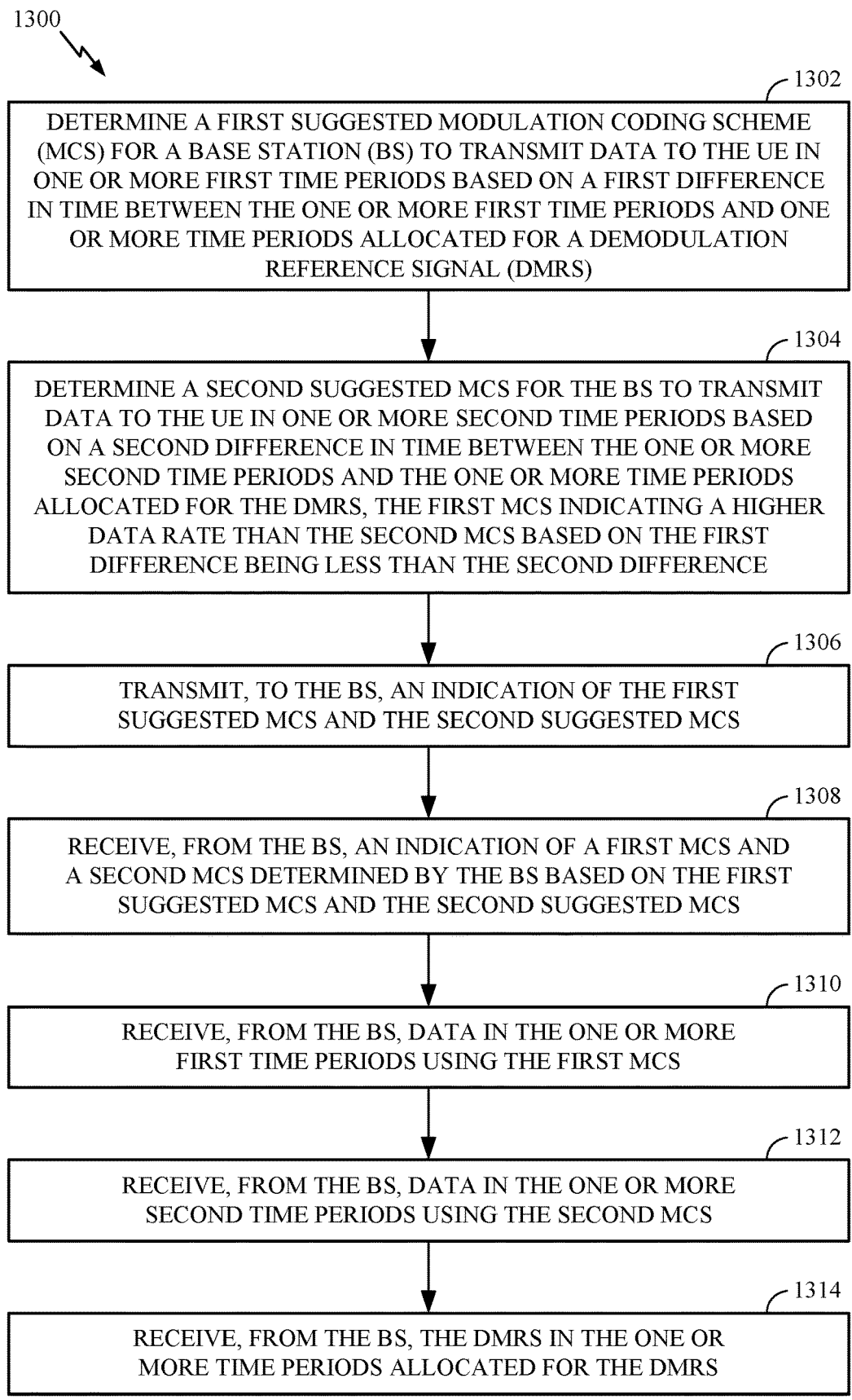
FIG. 13 is a flow diagram illustrating example operations for wireless communication, in accordance with certain aspects of the present disclosure

FIG. 13 is a flow diagram illustrating example operations 1300 for wireless communication, in accordance with certain aspects of the present disclosure. The operations 1300 may be performed by a UE, such as the UE 120.

The operations 1300 begin, at block 1302, by the UE determining a first suggested modulation coding scheme (MCS) for a base station (BS) to transmit data to the UE in one or more first time periods based on a first difference in time between the one or more first time periods and one or more time periods allocated for a demodulation reference signal (DMRS).

At block 1304, the UE determines a second suggested MCS for the BS to transmit data to the UE in one or more second time periods based on a second difference in time between the one or more second time periods and the one or more time periods allocated for the DMRS, the first MCS indicating a higher data rate than the second MCS based on the first difference being less than the second difference.

At block 1306, the UE transmits, to the BS, an indication of the first suggested MCS and the second suggested MCS. At block 1308, the UE receives, from the BS, an indication of a first MCS and a second MCS determined by the BS based on the first suggested MCS and the second suggested MCS.

At block 1310, the UE receives, from the BS, data in the one or more first time periods using the first MCS. At block 1312, the UE receives, from the BS, data in the one or more second time periods using the second MCS. At block 1314, the UE receives, from the BS, the DMRS in the one or more time periods allocated for the DMRS.

In certain aspects, the one or more first time periods, one or more second time periods, and the one or more time periods allocated for the DMRS correspond to orthogonal frequency-division multiplexing (OFDM) symbols of a single slot. In certain aspects, the first time difference is with respect to a first of the one or more time periods allocated for transmitting the DMRS and the second time difference is with respect to a second of the one or more time periods allocated for transmitting the DMRS. In certain aspects, the first time difference and the second time difference are with respect to a first of the one or more time periods allocated for transmitting the DMRS.

In certain aspects, the BS further determines a third MCS for transmitting data in one or more third time periods based on a third difference in time between the one or more third time periods and the one or more time periods allocated for transmitting the DMRS, and transmits data to the UE in the one or more third time periods using the third MCS.

In certain aspects, the UE further determines a third suggested MCS for the BS to transmit data to the UE in one or more third time periods based on a third difference in time between the one or more third time periods and the one or more time periods allocated for the DMRS, and transmits, to the BS, an indication of the third suggested MCS. The UE further receives, from the BS, an indication of a third MCS determined by the BS based on the third suggested MCS, and receives, from the BS, data in the one or more third time periods using the third MCS.

In certain aspects, the UE and/or the BS determines one or more parameters comprising one or more of a velocity of the UE, a Doppler between the BS and the UE, or a block error rate between the BS and the UE, wherein the first suggested MCS and the second suggested MCS are further determined based on the one or more parameters.

In certain aspects, the BS transmits a channel state information reference signal (CSI-RS) to the UE prior to the one or more first time periods, the one or more second time periods, and the one or more time periods allocated for transmitting the DMRS. The BS further receives channel state information feedback (CSF) from the UE based on a measurement of the CSI-RS by the UE, the CSF indicating a suggested first MCS and a suggested second MCS, wherein the first MCS and the second MCS are further determined based on the suggested first MCS and suggested second MCS, respectively.

In certain aspects, the BS transmits information indicative of the first MCS and the second MCS to the UE prior to the one or more first time periods, the one or more second time periods, and the one or more time periods allocated for transmitting the DMRS.

In certain aspects, the UE receives a channel state information reference signal (CSI-RS) from the BS prior to the one or more first time periods, the one or more second time periods, and the one or more time periods allocated for the DMRS, wherein the first suggested MCS and the second suggested MCS are further determined based on the received CSI-RS.

Figure 14:
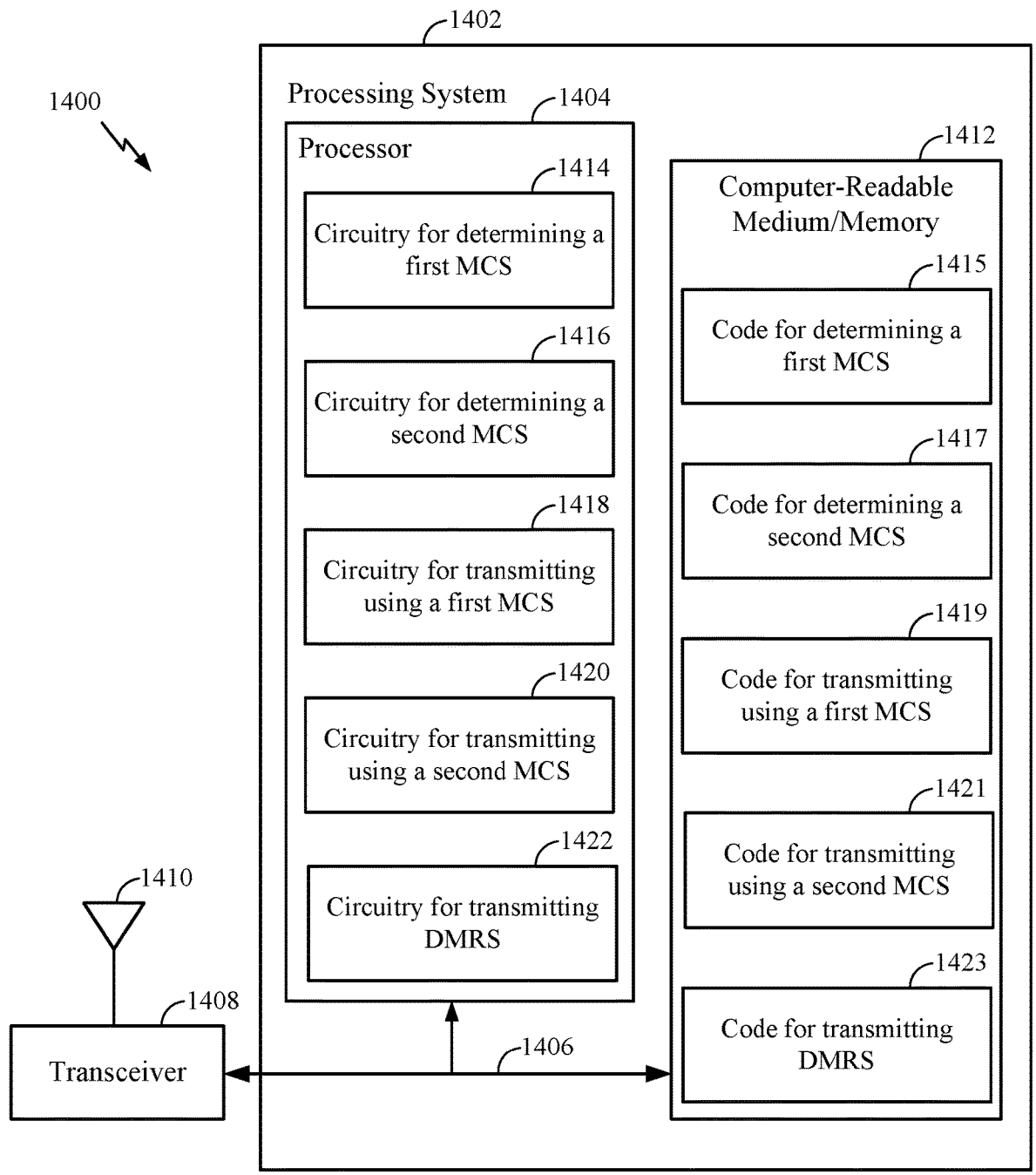
FIGS. 14 and 15 illustrate communications devices that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408. The transceiver 1408 is configured to transmit and receive signals for the communications device 1400 via an antenna 1410, such as the various signals as described herein, for example, for transmitting uplink transmissions with different transmission configuration. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for MCS determination. In certain aspects, computer-readable medium/memory 1412 stores code 1415 for determining a first MCS, code 1417 for determining a second MCS, code 1419 for transmitting using a first MCS, code 1421 for transmitting using a second MCS, and code 1423 for transmitting DMRS. In certain aspects, the processor 1404 has circuitry configured to implement the code stored in the computer-readable medium/memory 1412. The processor 1404 includes circuitry 1414 for determining a first MCS, circuitry 1416 for determining a second MCS, circuitry 1418 for transmitting using a first MCS, circuitry 1420 for transmitting using a second MCS, and circuitry 1422 for transmitting DMRS.

Figure 15:
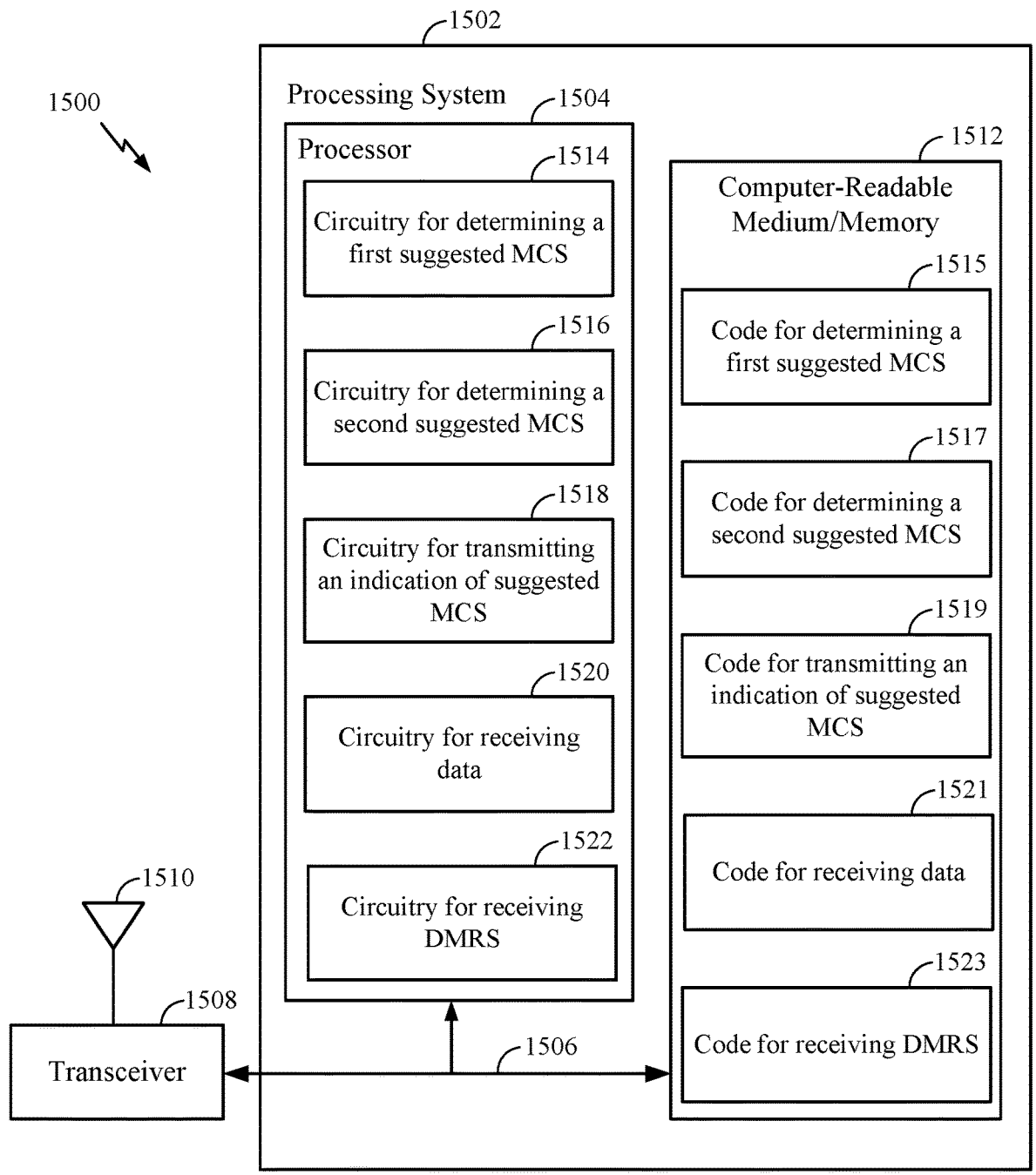

FIG. 15 illustrates a communications device 1500 that may include various components (e.g., corresponding to means-plus-function components) configured to perform operations for the techniques disclosed herein, such as the operations illustrated in FIG. 13. The communications device 1500 includes a processing system 1502 coupled to a transceiver 1508. The transceiver 1508 is configured to transmit and receive signals for the communications device 1500 via an antenna 1510, such as the various signals as described herein, for example, receiving uplink transmissions. The processing system 1502 may be configured to perform processing functions for the communications device 1500, including processing signals received and/or to be transmitted by the communications device 1500, such as interference control for uplink transmissions.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 13, or other operations for performing the various techniques discussed herein for interference control for MCS determination. In certain aspects, computer-readable medium/memory 1512 stores code 1515 for determining a first suggested MCS, code 1517 for determining a second suggested MCS, code 1519 for transmitting an indication of suggested MCS, code 1521 for receiving data, and code 1523 for receiving DMRS. In certain aspects, the processor 1504 has circuitry configured to implement the code stored in the computer-readable medium/memory 1512. The processor 1504 includes circuitry 1514 for determining a first suggested MCS, circuitry 1516 for determining a second suggested MCS, circuitry 1518 for transmitting an indication of suggested MCS, circuitry 1520 for receiving data, and circuitry 1522 for receiving DMRS.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Moreover, operations illustrated in flow diagrams with dashed lines indicate optional features.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 12 and FIG. 13.

Further, it should be appreciated that modules and/or other appropriate means for performing the methods and techniques described herein can be downloaded and/or otherwise obtained by a user equipment and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user equipment and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A base station (BS) comprising:
   a memory; and
   a processor coupled to the memory, the processor being configured to:
   determine a first modulation coding scheme (MCS) for transmitting data in one or more first time periods based on a first difference in time between the one or more first time periods and one or more time periods allocated for transmitting a demodulation reference signal (DMRS);
   determine a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference;
   transmit data to a user equipment (UE) in the one or more first time periods using the first MCS;
   transmit data to the UE in the one or more second time periods using the second MCS; and
   transmit the DMRS to the UE in the one or more time periods allocated for transmitting the DMRS.

2. The BS of claim 1, wherein the one or more first time periods, one or more second time periods, and the one or more time periods allocated for transmitting the DMRS correspond to orthogonal frequency-division multiplexing (OFDM) symbols of a single slot.

3. The BS of claim 1, wherein the first time difference is with respect to a first of the one or more time periods allocated for transmitting the DMRS and the second time difference is with respect to a second of the one or more time periods allocated for transmitting the DMRS.

4. The BS of claim 1, wherein the first time difference and the second time difference are with respect to a first of the one or more time periods allocated for transmitting the DMRS.

5. The BS of claim 1, wherein the processor is further configured to:
   determine a third MCS for transmitting data in one or more third time periods based on a third difference in time between the one or more third time periods and the one or more time periods allocated for transmitting the DMRS; and
   transmit data to the UE in the one or more third time periods using the third MCS.

6. The BS of claim 1, wherein the processor is further configured to:
   determine one or more parameters comprising one or more of a velocity of the UE, a Doppler between the BS and the UE, or a block error rate between the BS and the UE, wherein the first MCS and the second MCS are further determined based on the one or more parameters.

7. The BS of claim 1, wherein the processor is further configured to:
   transmit a channel state information reference signal (CSI-RS) to the UE prior to the one or more first time periods, the one or more second time periods, and the one or more time periods allocated for transmitting the DMRS; and
   receive channel state information feedback (CSF) from the UE based on a measurement of the CSI-RS by the UE, the CSF indicating a suggested first MCS and a suggested second MCS, wherein the first MCS and the second MCS are further determined based on the suggested first MCS and suggested second MCS, respectively.

8. The BS of claim 1, wherein the processor is further configured to:
   transmit information indicative of the first MCS and the second MCS to the UE prior to the one or more first time periods, the one or more second time periods, and the one or more time periods allocated for transmitting the DMRS.

9. A user equipment (UE) comprising:
a memory; and
a processor coupled to the memory, the processor being configured to:
  determine a first suggested modulation coding scheme (MCS) for a base station (BS) to transmit data to the UE in one or more first time periods based on a first difference in time between the one or more first time periods and one or more time periods allocated for a demodulation reference signal (DMRS);
  determine a second suggested MCS for the BS to transmit data to the UE in one or more second time periods based on a second difference in time between the one or more second time periods and the one or more time periods allocated for the DMRS, the first suggested MCS indicating a higher data rate than the second suggested MCS based on the first difference being less than the second difference;
  transmit, to the BS, an indication of the first suggested MCS and the second suggested MCS;
  receive, from the BS, an indication of a first MCS and a second MCS determined by the BS based on the first suggested MCS and the second suggested MCS;
  receive, from the BS, data in the one or more first time periods using the first MCS;
  receive, from the BS, data in the one or more second time periods using the second MCS; and
  receive, from the BS, the DMRS in the one or more time periods allocated for the DMRS.

10. The UE of claim 9, wherein the one or more first time periods, one or more second time periods, and the one or more time periods allocated for the DMRS correspond to orthogonal frequency-division multiplexing (OFDM) symbols of a single slot.

11. The UE of claim 9, wherein the first time difference is with respect to a first of the one or more time periods allocated for the DMRS and the second time difference is with respect to a second of the one or more time periods allocated for the DMRS.

12. The UE of claim 9, wherein the first time difference and the second time difference are with respect to a first of the one or more time periods allocated for the DMRS.

13. The UE of claim 9, wherein the processor is further configured to:
  determine a third suggested MCS for the BS to transmit data to the UE in one or more third time periods based on a third difference in time between the one or more third time periods and the one or more time periods allocated for the DMRS;
  transmit, to the BS, an indication of the third suggested MCS;
  receive, from the BS, an indication of a third MCS determined by the BS based on the third suggested MCS; and
  receive, from the BS, data in the one or more third time periods using the third MCS.

14. The UE of claim 9, wherein the processor is further configured to:
  determine one or more parameters comprising one or more of a velocity of the UE, a Doppler between the BS and the UE, or a block error rate between the BS and the UE, wherein the first suggested MCS and the second suggested MCS are further determined based on the one or more parameters.

15. The UE of claim 9, wherein the processor is further configured to:
  receive a channel state information reference signal (CSI-RS) from the BS prior to the one or more first time periods, the one or more second time periods, and the one or more time periods allocated for the DMRS, wherein the first suggested MCS and the second suggested MCS are further determined based on the received CSI-RS.

16. A method of wireless communication performed at a base station (BS), comprising:
  determining a first modulation coding scheme (MCS) for transmitting data in one or more first time periods based on a first difference in time between the one or more first time periods and one or more time periods allocated for transmitting a demodulation reference signal (DMRS);
  determining a second MCS for transmitting data in one or more second time periods based on a second difference in time between the one or more second time periods and the one or more time periods allocated for transmitting the DMRS, the first MCS indicating a higher data rate than the second MCS based on the first difference being less than the second difference;
  transmitting data to a user equipment (UE) in the one or more first time periods using the first MCS;
  transmitting data to the UE in the one or more second time periods using the second MCS; and
  transmitting the DMRS to the UE in the one or more time periods allocated for transmitting the DMRS.

17. The method of claim 16, wherein the one or more first time periods, one or more second time periods, and the one or more time periods allocated for transmitting the DMRS correspond to orthogonal frequency-division multiplexing (OFDM) symbols of a single slot.

18. The method of claim 16, wherein the first time difference is with respect to a first of the one or more time periods allocated for transmitting the DMRS and the second time difference is with respect to a second of the one or more time periods allocated for transmitting the DMRS.

19. The method of claim 16, wherein the first time difference and the second time difference are with respect to a first of the one or more time periods allocated for transmitting the DMRS.

20. The method of claim 16, further comprising:
  determining a third MCS for transmitting data in one or more third time periods based on a third difference in time between the one or more third time periods and the one or more time periods allocated for transmitting the DMRS; and
  transmitting data to the UE in the one or more third time periods using the third MCS.

21. The method of claim 16, further comprising:
  determining one or more parameters comprising one or more of a velocity of the UE, a Doppler between the BS and the UE, or a block error rate between the BS and the UE, wherein the first MCS and the second MCS are further determined based on the one or more parameters.

22. The method of claim 16, further comprising:
  transmitting a channel state information reference signal (CSI-RS) to the UE prior to the one or more first time periods, the one or more second time periods, and the one or more time periods allocated for transmitting the DMRS; and
  receiving channel state information feedback (CSF) from the UE based on a measurement of the CSI-RS by the UE, the CSF indicating a suggested first MCS and a suggested second MCS, wherein the first MCS and the second MCS are further determined based on the suggested first MCS and suggested second MCS, respectively.

23. The method of claim 16, further comprising:
transmitting information indicative of the first MCS and the second MCS to the UE prior to the one or more first time periods, the one or more second time periods, and the one or more time periods allocated for transmitting the DMRS.

24. A method of wireless communication performed at a user equipment (UE), comprising:
determining a first suggested modulation coding scheme (MCS) for a base station (BS) to transmit data to the UE in one or more first time periods based on a first difference in time between the one or more first time periods and one or more time periods allocated for a demodulation reference signal (DMRS);
determining a second suggested MCS for the BS to transmit data to the UE in one or more second time periods based on a second difference in time between the one or more second time periods and the one or more time periods allocated for the DMRS, the first suggested MCS indicating a higher data rate than the second suggested MCS based on the first difference being less than the second difference;
transmitting, to the BS, an indication of the first suggested MCS and the second suggested MCS;
receiving, from the BS, an indication of a first MCS and a second MCS determined by the BS based on the first suggested MCS and the second suggested MCS;
receiving, from the BS, data in the one or more first time periods using the first MCS;
receiving, from the BS, data in the one or more second time periods using the second MCS; and
receiving, from the BS, the DMRS in the one or more time periods allocated for the DMRS.

25. The method of claim 24, wherein the one or more first time periods, one or more second time periods, and the one or more time periods allocated for the DMRS correspond to orthogonal frequency-division multiplexing (OFDM) symbols of a single slot.

26. The method of claim 24, wherein the first time difference is with respect to a first of the one or more time periods allocated for the DMRS and the second time difference is with respect to a second of the one or more time periods allocated for the DMRS.

27. The method of claim 24, wherein the first time difference and the second time difference are with respect to a first of the one or more time periods allocated for the DMRS.

28. The method of claim 24, further comprising:
determining a third suggested MCS for the BS to transmit data to the UE in one or more third time periods based on a third difference in time between the one or more third time periods and the one or more time periods allocated for the DMRS;
transmitting, to the BS, an indication of the third suggested MCS;
receiving, from the BS, an indication of a third MCS determined by the BS based on the third suggested MCS; and
receiving, from the BS, data in the one or more third time periods using the third MCS.

29. The method of claim 24, further comprising:
determining one or more parameters comprising one or more of a velocity of the UE, a Doppler between the BS and the UE, or a block error rate between the BS and the UE, wherein the first suggested MCS and the second suggested MCS are further determined based on the one or more parameters.

30. The method of claim 24, further comprising:
receiving a channel state information reference signal (CSI-RS) from the BS prior to the one or more first time periods, the one or more second time periods, and the one or more time periods allocated for the DMRS, wherein the first suggested MCS and the second suggested MCS are further determined based on the received CSI-RS.

* * * * *